United States Patent Office 3,159,383
Patented Dec. 1, 1964

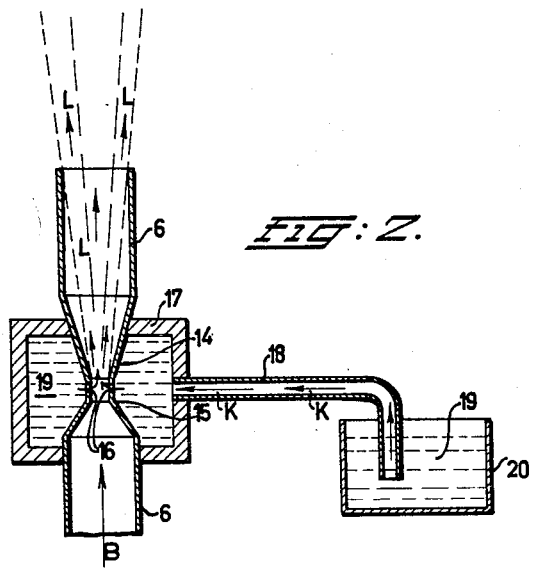
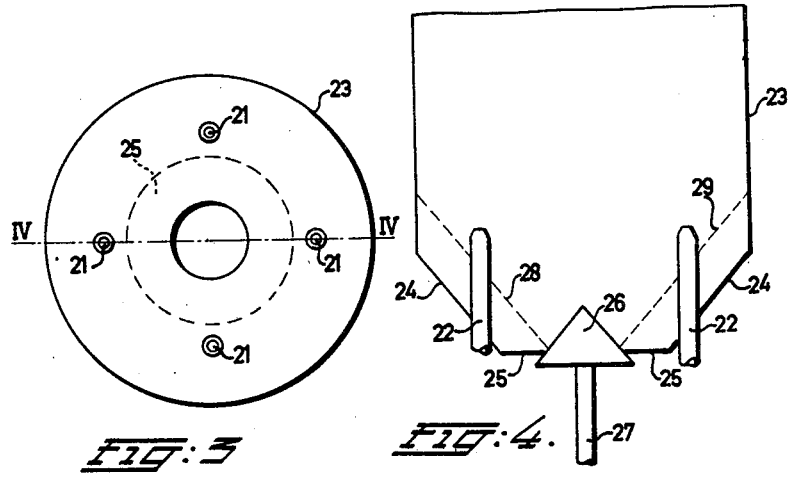

3,159,383
METHOD OF MIXING MATERIALS AND A PNEUMATIC MIXING DEVICE ADAPTED TO SAID METHOD
Lourens B. van Munster, Voorthuizen, Netherlands, assignor to Vometec N.V., Voorthuizen, Netherlands, a Dutch limited-liability company
Filed June 7, 1961, Ser. No. 115,455
Claims priority, application Netherlands, June 10, 1960, 252,521
7 Claims. (Cl. 259—4)

This invention relates to a new method of mixing solid materials, such as granular solids, either alone or with other solid materials, or with fluids, and also relates to an apparatus for carrying out said method.

It is known to put granular solids which are to be mixed into a container and thereafter subject them to an air current, which is introduced into the container at the bottom thereof and forms a column of air through the solids, the velocity of the air current being greatest at its nucleus (i.e. along the axis of the air current) and at least in the region of the periphery of the current. This procedure causes the solids to move laterally inwards towards the nucleus of the air current which conveys the solids upwards towards the top of the container. At the upper end of the air column, the solids entrained in the conveying air current are carried clear of the bulk of the solids and spill over radially into an annulus which forms a column of descending solids in the region of the walls of the container.

However, it is often desired to mix solid components which differ widely in their weight and, in such cases, difficulty arises since, if the velocity of the nucleus of the air current i.e. the conveying air current, is held low enough so as not to cause the lighter components to be carried clear of the bulk of the materials and, possibly to the top of the container where they may stick, then the heavier component will not be moved by the periphery of the air current. Alternatively, if the velocity of the air current is adjusted so as to enable the heavier components to be moved satisfactorily, then the lighter components will be carried clear of the bulk of the material in the container. In either case the efficiency of the mixing is poor.

According to one aspect of the invention, there is provided a method of mixing materials comprising the steps of introducing the materials into a mixing chamber so as to only partly fill the latter, directing at least one gas stream upwardly through said mixing chamber from the bottom thereof with each of the gas streams having a nucleus in which the upward velocity is substantially greater than the minimum conveying velocity of the heaviest of said materials and also greater than the upward velocity in the portions of said air stream surrounding said nucleus, while the upward velocity in said surrounding portions is greater than the fluidization velocity of said materials and less than the terminal velocity of the lightest of said materials, and laterally expanding said gas stream immediately above the top of the mixing chamber to quickly reduce the velocity in said nucleus to a value less than said terminal velocity of the lightest of said materials so that the materials in said mixing chamber are formed into a dense-phase fluidized bed by said surrounding portions of the gas stream and materials are continuously carried upward from said bed by said nucleus of the gas stream and circulated outwardly upon lateral expansion of the gas stream above the top of the mixing chamber to return through the latter to said bed.

According to another object of the invention the method further comprises the step of inducing the flow into said nucleus of the gas stream at the bottom of said chamber of a liquid material included in said materials to be mixed.

Still another object of the invention is to provide a pneumatic mixing device comprising an erect, substantially cylindrical vessel which is open at the top and has a bottom wall, a porous false bottom in said vessel spaced from said bottom wall to define a space between said false bottom and said bottom wall and a mixing chamber in said vessel above said false bottom, a first gas inlet tube opening into said space, at least one second gas inlet tube extending through said bottom wall and false bottom and having an opening adjacent the latter in said mixing chamber, means for supplying compressed gas to said first and second gas inlet tubes so that gas is made to flow upwardly in said mixing chamber from said porous false bottom and said opening of the second inlet tube with the upward velocity of the gas exhausted from said opening of the second gas inlet tube being substantially greater than the upward velocity of the gas exhausted from said space through said porous false bottom, and an expansion vessel extending upwardly from the top of said cylindrical vessel and communicating directly with the latter, said expansion vessel having a side wall which flares upwardly and outwardly from the top of said cylindrical vessel.

Further according to another object of the invention said pneumatic mixing device has a plurality of said second gas inlet tubes which extend through said bottom wall and false bottom and are distributed over the area thereof.

Advantageously according to the invention said pneumatic mixing device has a false bottom which is substantially frusto-conical with its smallest diameter at the lower edge thereof, said bottom wall having a central outlet surrounded by said lower edge of the frusto-conical false bottom and having a removable closure; and wherein said plurality of second gas inlet tubes are uniformly spaced apart around said outlet.

Still another object of the invention is to provide said pneumatic mixing device with a second gas inlet tube having a venturi section; and further comprising a feed tube opening into said venturi section for supplying a liquid to the latter so that such liquid is atomized and carried along by the compressed gas issuing into said mixing chamber from said second gas inlet tube.

It will be appreciated that the mixture of materials deposited in the mixing chamber are forced by means of the gas stream entering into said mixing chamber through its porous false bottom, into a state in which they form a "so-called" dense-phase fluidized bed, and that the conveying gas entering into said mixing chamber by means of the gas inlet tubes will produce, at one or more points of said dense-phase fluidized bed, channels containing conically diverging, vigorous and upwardly directed gas streams. The gas streams carry part of the materials upwards into the expansion vessel from which they return into the mixing chamber. As a result of the vigorous gas streams, the materials in the mixing chamber will be drawn out of the dense-phase fluidized bed into the streams, which carry said material upwards into the expansion vessel where they spill out radially and return to the fluidized bed. Moreover, when a liquid or the like is introduced into the mixing chamber by passage through a gas inlet tube, then as a result of the very high velocity of the gas stream on entry into the mixing chamber, said liquid will be distributed throughout the conically diverging gas stream within the mixing chamber in a very finely divided state thus ensuring an intimate mixing of this finely distributed liquid with the other materials.

For a better understanding of the invention and to show how the same may be carried into effect, reference will now be made, by way of example, to the accompanying drawings in which:

FIGURE 2 is a cross-section of an inlet tube whereby a liquid can be introduced into the device;

FIGURE 3 is a plan view of the mixing device shown in FIGURE 4; and

FIGURE 4 is a cross-section taken along the line IV—IV of FIGURE 3.

Figure 1:
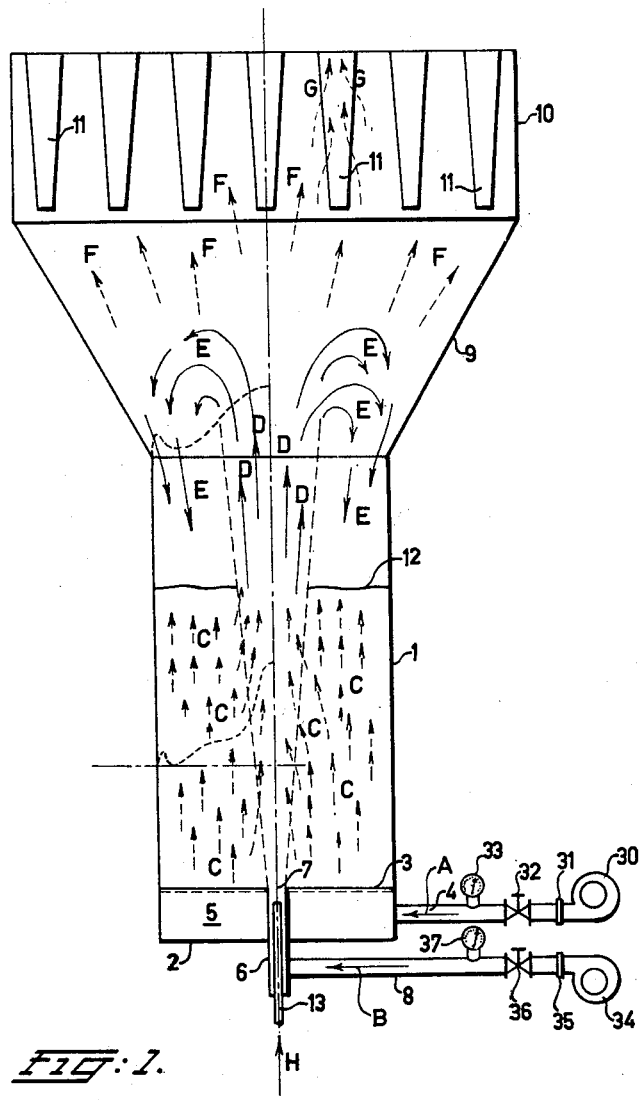
FIGURE 1 is a diagrammatic longitudinal cross-section of a mixing device embodying this invention.

Referring first to FIGURE 1 of the accompanying drawings, it will be seen that a mixing container 1, which is of a cylindrical shape, is provided at the bottom thereof with a space 5 which is defined between the bottom wall 2 of the container 1 and the porous false bottom 3. A first gas inlet tube 4 opens into space 5 and provides means whereby a gas A at a known adjustable pressure can be introduced into said space whence it can enter a mixing chamber defined in container 1 above false bottom 3 by passing through the latter. Said gas A is introduced in said conduit 4 by an air compressor 30 connected to said conduit 4 by means of a coupling 31. An adjustable pressure regulator 32 is interposed between said compressor 30 and space 5, and a pressure gauge 33 is connected to said conduit 4 for indicating the pressure in said space 5. A second gas inlet tube 6 passes through the non-porous bottom wall 2 of container 1 and through the false bottom 3 and has an opening 7 adjacent the false bottom in the mixing chamber in container 1. A conduit 8 is connected to inlet tube 6 thereby enabling a gas B to be supplied through the latter to the container 1. Said gas B is introduced into said conduit 8 by an air compressor 34 connected to said conduit 8 by means of a coupling 35, and an adjustable pressure regulator 36 and a pressure gauge 37 are connected to said conduit 8 for supervising the pressure in said inlet tube 6.

The dimensions of the conduits 4 and 8, the inlet tube 6, the opening 7 and the space 5 determine the pressures at which the gases A and B are supplied to the apparatus. The gas A, i.e. the gas entering container 1 through the porous or perforated false bottom 3, has a considerably lower exhaust velocity than the gas B, which enters container 1 through the opening 7.

The exhaust velocities of gases A and B are such that the velocity of gas A i.e. the gas fluidizing the contents of the chamber in container 1, does not exceed the maximum fluidization velocity of the materials whereas that of the conveying gas B entering through the opening 7 exceeds the conveying velocity of the heaviest component of the mixture of materials.

As a result, the materials to be mixed are carried continuously upwards by gas B in a vigorous diverging conically shaped gas stream till they arrive at the top of said mixing container 1, the suction produced thereby within the mixing container forcing the materials out of the fluidized bed, as formed by gas A, into the circular movement produced by said vigorous gas stream. The small arrows C depicted in the mixing container illustrate in a general sense the movement of the materials. At the end of the upward movement the materials travel in the direction of the arrows D into an expansion vessel 9 which is arranged on top of the mixing container 1. In this expansion vessel 9, the velocity of the gas in the conical diverging gas stream decreases rapidly and falls to below the terminal velocity of the lightest component of the materials to be mixed, consequently said materials will spill over and disperse into a more or less outwardly bent path returning along the walls of the expansion vessel 9 into the container 1 (as depicted by the arrows E). This procedure is continuous. In some cases it is possible that very light particles of the materials move upwardly into the region of the top of the apparatus (see the arrows F) although this is, of course, avoided as much as possible. However, in this connection material catchers 11 are provided in the uppermost part 10 of the device. The very fine particles are caught in these catchers in the manner indicated by the arrows G. It will be appreciated that normally one or more closable inlets (not shown) are provided to permit deposit of the materials to be mixed in the container 1 of the apparatus.

When employing the method of the invention, the mixing chamber in container 1 is normally only partly filled so that initially the materials to be mixed reach up to the level 12. The materials fall back from the expansion vessel 9 as indicated by the arrows E, and pass through the uppermost, originally unfilled, part of the mixing container 1 and re-mix with the materials present in the dense-phase fluidized bed. When the mixing process is finished, the resulting product is removed from the container 1 by various means known to the art.

FIGURE 1 also indicates diagrammatically a method of feeding a liquid H into the mixing container 1 by way of a tube 13, said liquid forming one of the components to be mixed. By providing the tube 13 with a venturi type delivery means preferably at a point near to the end of said tube 13 in the inlet tube 6, the conveying gas B streaming at a high velocity through the inlet tube 6 automatically sucks liquid out of the tube 13, thereby distributing said liquid very finely in the gas stream which enters at a high exhaust velocity into the mixing chamber of container 1. This furthers to a considerable extent the intimate mixing of the liquid H with the other materials to be mixed therewith.

A particular embodiment of such a venturi-type delivery means is shown diagrammatically in FIGURE 2. In this case the inlet tube 6 is itself formed with a venturi-shaped part 14 having inlet apertures 16 arranged in the throat 15. Further the part 14 is surrounded by a liquid container 17 which is sealed to the wall of the tube 6. A conduit 18 has one end leading into said liquid container 17 and the other end dipping into a body of liquid 19 contained in tank 20. The gas stream B creates a low pressure at throat 15 which sucks the liquid 19 into the liquid container 17, as indicated by the arrows K, thereby filling up this container completely. The liquid 19 in container 17 enters tube 6 through the inlet apertures 16. Immediately beyond the venturi-shaped part 14 there is effected the beginning of a conical spread of the gas stream in which the liquid is very finely distributed (as shown by the arrows L).

The apparatus is not limited to having only one inlet tube 6 through which the conveying gas B is introduced into the mixing chamber of container 1. On the contrary, it is possible to have more than one gas inlet tube in each mixing chamber so that more vigorous upwardly directed gas streams are produced at several points in the mixing chamber. FIGURES 3 and 4 show four gas inlet tubes 22 having openings 21 at their upper ends within a mixing container 23. This mixing container 23 has a frusto-conical bottom end portion 24 with a central flat bottom wall portion 25. The gas tubes 22 are positioned about the central flat bottom wall portion 25 so as to leave the same perfectly free. This central portion can be opened and closed again by a removable closure 26 with a pull rod 27 as shown diagrammatically in FIGURE 4. The mixing vessel 23 is provided in this embodiment with two false bottom plates 28 and 29 extending in a direction parallel to the wall of the frusto-conical bottom end portion 24, whereby the fluidizing gas can enter the container 23. The product obtained after use of the apparatus can be easily discharged from the mixing vessel by downwardly displacing the closure 26.

What is claimed is:

1. A method of intermittently contacting and mixing materials comprising the steps of introducing at least one of the materials into a mixing chamber so as to only partly fill the latter, directing at least one gas stream upwardly through said mixing chamber from the bottom thereof with said gas stream having a nucleus in which the upward velocity is substantially greater than the minimum conveying velocity of the heaviest of said materials and also greater than the upward velocity in the portions of said gas stream surrounding said nucleus, the upward velocity in said surrounding portions being sufficient to form a dense-phase fluidized bed of the materials introduced into said chamber and through which the conveying nucleus passes, inducing the flow into said nucleus of the gas stream at the bottom of said chamber of another material included in said materials to be intermittently contacted and mixed so that said other material is atomized in said gas stream, and laterally expanding said nucleus of the gas stream immediately above the top of the mixing chamber to quickly reduce the velocity in said nucleus to a value less than the terminal velocity of the lightest of said materials so that the first mentioned material is continuously carried upward from said dense-phase fluidized bed by said nucleus of the gas stream and intermittently contacted with the atomized material in the latter prior to being circulated outwardly upon lateral expansion of the gas stream above the top of the mixing chamber for return through the latter to said dense-phase fluidized bed.

2. A method as in claim 1, wherein said other material induced to flow into said nucleus of the gas stream is a liquid.

3. The method as in claim 1, wherein the upward velocity in said nucleus of the gas steam at the bottom of said mixing chamber is sufficiently great to ensure that the upward velocity in said nucleus at the top of said mixing chamber is at least as great as the minimum conveying velocity of said heaviest of the materials.

4. A pneumatic device comprising an erect, substantially cylindrical vessel which is open at the top and has a bottom wall, a porous false bottom in said vessel spaced from said bottom wall to define a space between said false bottom and said bottom wall and a mixing chamber in said vessel above said false bottom, a first gas inlet tube opening into said space, at least one second gas inlet tube extending through said bottom wall and false bottom and having an opening adjacent the latter in said mixing chamber, means for supplying compressed gas to said first and second gas inlet tubes so that gas is made to flow upwardly in said mixing chamber from said porous false bottom and from said opening of the second inlet tube with the upward velocity of the gas exhausted from said opening of the second gas inlet tube being substantially greater than the upward velocity of the gas exhausted from said space through said porous false bottom, and an expansion vessel extending upwardly from the top of said cylindrical vessel and communicating directly with the latter, said expansion vessel having a side wall which flares upwardly and outwardly from the top of said cylindrical vessel.

5. A pneumatic mixing device as in claim 4; wherein a plurality of said second gas inlet tubes extend through said bottom wall and false bottom and are distributed over the area thereof.

6. A pneumatic mixing device as in claim 5; wherein said false bottom is substantially frusto-conical with its smallest diameter at the lower edge thereof, said bottom wall has a central outlet surrounded by said lower edge of the frusto-conical false bottom, and said plurality of second gas inlet tubes are uniformly spaced apart around said outlet; and further comprising a removable closure normally closing said outlet.

7. A pneumatic mixing device as in claim 4; wherein said second gas inlet tube has a venturi section; and further comprising a feed tube opening into said venturi section for supplying a liquid to the latter so that such liquid is atomized and carried along by the compressed gas issuing into said mixing chamber from said second gas inlet tube.

References Cited by the Examiner
UNITED STATES PATENTS

| | | | |
|---|---|---|---|
| 2,705,620 | 4/55 | Borck | 259—4 |
| 2,718,471 | 9/55 | Samler | 259—4 X |
| 2,786,280 | 3/57 | Gishler et al. | |
| 2,992,084 | 7/61 | Schropp | 259—4 X |

FOREIGN PATENTS

| | | |
|---|---|---|
| 1,057,425 | 5/59 | Germany. |
| 1,220,788 | 1/60 | France. |

WALTER A. SCHEEL, *Primary Examiner.*

NELSON M. ELLISON, *Examiner.*